United States Patent Office 3,438,965
Patented Apr. 15, 1969

3,438,965
DISAZO DYES FOR TEXTILE MATERIALS
Max A. Weaver and David J. Wallace, Kingsport, Tenn., assignors to Eastman Kodak Company, Rochester, N.Y., a corporation of New Jersey
No Drawing. Filed Aug. 17, 1965, Ser. No. 480,500
Int. Cl. C09b 33/06, 33/00, 31/04
U.S. Cl. 260—187
9 Claims

ABSTRACT OF THE DISCLOSURE

Azobenzene-azo-aniline compounds having a di(acyl)amidoalkyl group attached to the nitrogen atom of the aniline coupling component are useful as dyes for hydrophobic textile materials.

This invention relates to disazo compounds particularly useful as dyes for textile fibers, yarns and fabrics. More particularly, this invention relates to disazo compounds of the general formula I 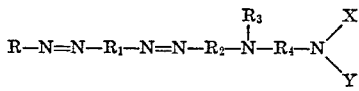

wherein R represents a monocyclic carbocyclic aromatic radical of the benzene series including unsubstituted and substituted phenyl such as alkylphenyl, e.g., o,m,p-tolyl; alkoxyphenyl, e.g., o,m,p-methoxyphenyl; halophenyl, e.g., o,m,p-chlorophenyl; nitrophenyl, e.g., o,m,p-nitrophenyl; alkylsulfonylphenyl, e.g., o,m,p-methylsulfonylphenyl; alkylsulfonamidophenyl, e.g., o,m,p-methylsulfonamidophenyl; di(alkylsulfonyl)phenyl, e.g., 2,5-di(methylsulfonyl)phenyl; dicarboxylicacidimidophenyl, e.g., o, m-succinimidophenyl; fluoroalkylphenyl, e.g., trifluoromethylphenyl; acylamidophenyl, e.g., o,m,p-acetamidophenyl; cyanophenyl, e.g., o,m,p-cyanophenyl; carboxamidophenyl, e.g., o,m,p-carboxamidophenyl; benzamidophenyl; thiocyanophenyl, e.g., o,m,p-thiocyanophenyl; alkylthiophenyl, e.g., o,m,p-methylthiophenyl; benzoxyphenyl, e.g., o,m,p-benzoxyphenyl; benzaminophenyl, e.g., o,m,p-benzaminophenyl; benzylaminophenyl, e.g., o,m,p-benzylaminophenyl; N-alkylbenzaminophenyl, e.g., N-phenylmethylaminophenyl; formylphenyl, e.g., o,m,p-formylphenyl; carbalkoxyphenyl, e.g., o,m,p-carbethoxyphenyl; benzoylphenyl, e.g., o,m,p-benzoylphenyl; etc.; $R_1$ and $R_2$ represent monocyclic carbocyclic aromatic radicals of the benzene series including unsubstituted p-phenylene and p-phenylene substituted with lower alkyl, e.g., o,m-methyl-p-phenylene; lower alkoxy, e.g., o,m-methoxy-p-phenylene; halophenylene, o,m-chloro-p-phenylene; lower alkylthio, e.g., o,m-methylthio-p-phenylene; lower alkanoylamido, e.g., o,m-acetamido-p-phenylene; lower alkylsulfonamido-p-phenylene; or benzamido; $R_3$ represents hydrogen or an alkyl radical preferably lower alkyl, i.e., from 1 to 4 carbon atoms, being unsubstituted or substituted such as hydroxyalkyl, e.g., hydroxyethyl; polyhydroxyalkyl, e.g., glyceryl [—$CH_2CHOHCH_2OH$]; lower alkoxyalkyl, e.g., methoxyethyl; cyanoalkyl, e.g., cyanoethyl; lower cyanoalkoxyalkyl, e.g., β-cyanoethoxyethyl; lower alkanoyloxy-alkyl, e.g., acetoxyethyl; lower alkoxycarbonylalkyl, e.g., ethoxycarbonylethyl; halogenoalkyl, e.g., chloroethyl; hydroxyhalogenolakyl, e.g., β-hydroxy-γ-chloropropyl; lower alkylsulfonylalkyl, e.g., methylsulfonylethyl; lower alkyl —$OCOOCH_2CH_2$—, e.g., $CH_3OCOOCH_2CH_2$—; carbamoylalkyl, e.g. carbamoylethyl; lower alkylcarbamoylalkyl, e.g., ethylcarbamoylethyl; benzyl, phenoxyalkyl, e.g., β-phenoxyethyl; lower alkylsulfonamidoalkyl, e.g., methylsulfonamidoethyl; dicarboxamidoalkyl, e.g., β-dicarboxamidoethyl, etc. or $R_3$ represents a monocyclic carbocyclic aromatic group of the benzene series, e.g., unsubstituted phenyl and substituted phenyl such as represented by R, above e.g. lower alkylphenyl, lower alkoxyphenyl, halophenyl, etc. As can be seen from the examples below, the substituents attached to R, $R_1$, $R_2$ and $R_3$ serve primarily as auxochrome groups to control the color of the disazo compounds; $R_4$ represents a lower alkylene group i.e. a straight or branched aliphatic chain of from 1 to 4 C atoms; and X and Y represent the same or different acyl groups, such as lower alkanoyl; e.g. propionyl; aroyl, e.g. benzoyl; lower alkoxycarbonyl, e.g. ethoxycarbonyl carbamoyl; e.g. phenyl carbamoyl; etc. or; sulfonyl groups such as, lower alkylsulfonyl, e.g. methylsulfonyl; arysulfonyl, e.g. phenylsulfonyl; etc.

The disazo compounds of this invention are prepared by diazotization of amino disazo compounds, $$R—N=N—R_1—NH_2$$

wherein R and $R_1$ are as defined above, and coupling the diazotized products with the coupler of general formula II 
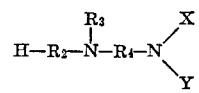

wherein $R_2$, $R_3$, $R_4$, X and Y have the meanings given above.

Particularly useful compounds of this invention are of the three general formulas:

III 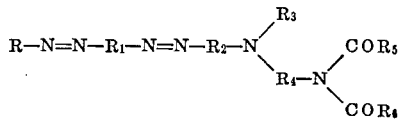

IV 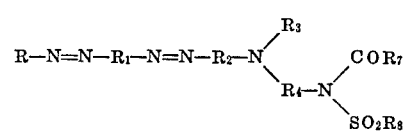

V 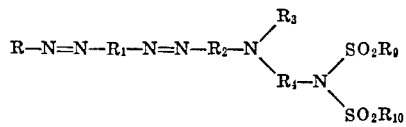

wherein R, $R_1$, $R_2$, $R_3$ and $R_4$ are as defined above, $R_5$ and $R_6$=lower alkyl, lower alkoxy, phenyl or phenyl substituted with lower alkyl, lower alkoxy, or halogen, $R_7$ and $R_8$=lower alkyl, phenyl, or phenyl substituted with lower alkyl, lower alkoxy, or halogen, and $R_9$ and $R_{10}$= lower alkyl, phenyl, or phenyl substituted with lower alkyl, lower alkoxy, or halogen.

The groups X and Y differentiate these compounds from prior art compounds and favorably affect the dye characteristics such as light fastness and resistance to sublimation, especially when the compounds are used for dyeing textile materials. The substituents attached to R, $R_1$, $R_2$, $R_3$, $R_4$, $R_5$, $R_6$, $R_7$, $R_8$, $R_9$ and $R_{10}$ are not critical and serve primarily as auxochromes to control the color of the disazo compound, as shown by the examples below. Thus, the disazo compounds meet well the tests for textile dyes described in the A.A.T.C.C. Technical Manual, 1964 edition, including fastness to light, sublimation, perspiration, washing and a variety of other chemical agents. The disazo compounds can be expected to exhibit distinctive properties and advantages as dyes compared to similar azo or disazo compounds containing acyl groups when tested by these methods. The specific alkyl radicals and carbocyclic radicals given above are exemplary of the $R_5$, $R_6$, $R_7$, $R_8$, $R_9$ and $R_{10}$ groups.

The coupling components having the above Formula II are prepared in the following manner:

$$H-R_2-\overset{R_3}{\underset{|}{N}}-R_4-NH_2 + XCl \longrightarrow H-R_2-\overset{R_3}{\underset{|}{N}}-R_4-NH-X$$

$$H-R_2-\overset{R_3}{\underset{|}{N}}-R_4-NHX + YCl \longrightarrow H-R_2-\overset{R_3}{\underset{|}{N}}-R_4-NXY$$

wherein $R_2$, $R_3$, $R_4$, X and Y are as defined above. These reactions result in compounds in which the newly substituted amines are diacyl substituted, disulphonyl substituted or acylsulphonyl substituted depending on the reactants chosen.

The resultant disazo compounds can be used for dyeing textile materials including synthetic polymer fibers, yarns and fabrics giving a variety of fast shades including blue, yellow red and brown when applied thereto by conventional dyeing methods. The compounds have moderate affinity for cellulose ester and polyamide fibers and possess the valuable property of staining wool less than do previous disazo dyes. When the disazo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative disazo compounds of our invention. All of the couplers used were prepared in the manner described in co-pending application Ser. No. 458,417 filed May 24, 1965, now Patent No. 3,379,713.

EXAMPLES OF THE DYES

Example 1

(A) Diazotization.—1.8 g. dry NaNO₂ was dissolved in 12.5 cc. conc. sulfuric acid. This solution was cooled to about 5° C. and 25 cc. 1:5 acid (1 part propionic acid to 5 parts acetic acid) while the temperature was maintained below 10° C. Then 5.97 g. (.025 m.) of 1-amino-2,5,2'-trimethyl-azobenzene was added, followed by 25 cc. of 1:5 acid. The reaction mixture was stirred 2 hr. at ice-bath temperature.

(B) Coupling.—The chilled reaction mixture from 1A above was added to a solution of 6.58 g. (.025 m.) of N-[2-(N'-ethyl-m-toluidino)ethyl] diacetamide in 50 cc. of 1:5 acid. The coupling mixture was neutralized to Congo red with solid ammonium acetate. After reacting for 2 hrs. the reaction mixture was drowned in water, filtered, washed with water, and dried. The product dyed cellulose acetate, polyester, and nylon fibers a brilliant red with outstanding properties on nylon. The product has the following structure:

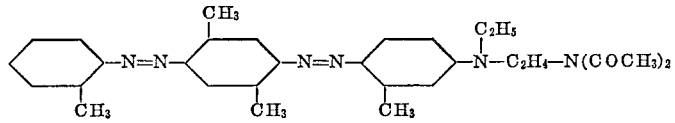

Example 2

(A) Diazotization.—The diazotization procedure of Example 1A was followed using 4.9 g. (.025 m.) of p-aminoazobenzene as the diazonium component.

(B) Coupling.—The chilled reaction product from Example 2A was added to a solution of 7.5 g. (.025 m.) of N-acetyl-N-[2-(N'-ethyl-m-toluidino)ethyl] methanesulfonamide in 50 cc. of 1:5 acid. The coupling mixture was neutralized to Congo red with solid ammonium acetate. After reacting for 2 hr. the reaction mixture was drowned in water, filtered, washed with water and dried. The product dyed polyester, and nylon fibers a red shade of excellent fastness properties.

Example 3

(A) Diazotization.—The diazotization mixture was prepared as in Example 2A above.

(B) Coupling.—The procedure of Example 2B was followed except using 8.4 g. (.025 m.) of N-[2-(N'-ethyl-m-toluidino)ethyl] dimethanesulfonamide as the coupler. The product dyed nylon and polyester fibers a red shade of excellent fastness properties.

Example 4

The procedure of Example 2 was followed using 4.9 g. (.025 m.) p-aminoazobenzene as the diazonium component and 6.58 g. (.025 m.) N-[2-(N'-ethyl-m-toluidino)ethyl] diacetamide as the coupler. The product dyed nylon and polyester fibers a red shade of excellent fastness properties.

Example 5

The procedure of Example 1 was followed except using as the diazonium component 5.65 g. (.25 m.) o-aminoazotoluene. The product dyed nylon and polyester fibers a red shade of excellent fastness properties.

Example 6

The procedure of Example 1 was followed except using 5.8 g. of 4-amino-3-chloroazo benzene as the diazonium component. The product dyed nylon and polyester fibers a red shade of excellent fastness properties. The product has the following formula:

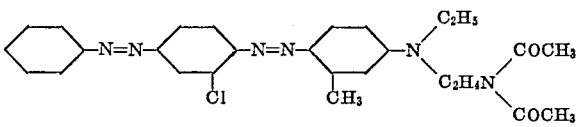

The following table is illustrative of other examples of compounds of the present invention.

| Ex. No. | Substituents on the Aromatic Nucleus of R | Substituents on the Aromatic Nucleus of $R_1$ | $R_2$ | $R_3$ | $R_4$ | X | Y | Color |
|---|---|---|---|---|---|---|---|---|
| 7 | None | None | m-Tolylene | —$C_2H_5$ | —$CH_2CH_2$— | $CH_3CO$— | $CH_3CO$— | Red. |
| 8 | do | do | do | —$C_2H_4CN$ | —$CH_2CH_2$— | $CH_3CO$— | $CH_3SO_2$— | Orange. |
| 9 | do | do | do | —$C_2H_4OH$ | —$CH_2CH_2$— | $CH_3SO_2$— | $CH_3SO_2$— | Red. |
| 10 | do | do | do | —$C_2H_4Cl$ | —$CH_2CH_2$— | $C_6H_5CO$— | $CH_3SO_2$— | Orange. |
| 11 | 4-Cl | do | Phenylene | $C_2H_5$ | —$(CH_2)_3$— | $C_6H_5SO_2$— | $C_6H_5SO_2$— | Red. |
| 12 | 3-Cl | do | do | —$C_6H_5$ | —$(CH_2)_3$— | $C_6H_5CO$— | $C_6H_5CO$— | Red. |
| 13 | 2-Cl | do | do | —$C_2H_4NXY$ | —$CH_2CH_2$— | $CH_3SO_2$— | $CH_3CH_2CO$ | Orange. |
| 14 | 3,6-di-Cl | do | do | $C_2H^5$ | —$CH_2CH(CH_3)CH_2$— | $C_2H_5SO_2$— | $C_2H_5SO_2$— | Red. |
| 15 | None | do | do | —$C_2H_3OCOCH_3$ | —$CH_2CH(CH_3)CH_2$— | $C_2H_5SO_2$— | $C_2H_5OCO$— | Red. |
| 16 | do | do | do | —$C_2H_4OCONHC_6H_5$ | —$CH_2CH(CH_3)CH_2$— | $CH_3SO_2$— | $C_6H_5NHCO$— | Red. |

| Ex. No. | Substituents on the Aromatic Nucleus of R | Substituents on the Aromatic Nucleus of $R_1$ | $R_2$ | $R_3$ | $R_4$ | X | Y | Color |
|---|---|---|---|---|---|---|---|---|
| 17 | do | do | do | —$C_2H_4CO_2C_2H_5$ | —$CH_2CH_2$— | $CH_3SO_2$— | $C_6H_5SO_2$— | Red. |
| 18 | 2-$CH_3$ | 2-$CH_3$ | m-Tolylene | —$C_2H_5$ | —$CH_2CH_2$— | $CH_3CO$— | $CH_3CO$— | Red. |
| 19 | 2-$CH_3$ | 2-$CH_3$ | do | —$C_2H_4CONH_2$ | —$CH_2CH_2$— | $CH_3SO_2$— | $CH_3SO_2$— | Red. |
| 20 | 4-$CH_3$ | 3-$CH_3$ | do | —$C_2H_4SO_2CH_3$ | —$CH_2CH_2$— | $CH_3SO_2$— | $CH_3SO_2$— | Red. |
| 21 | 4-$CH_3$ | 3-$CH_3$ | do | —$C_2H_4OCH_3$ | —$CH_2CH_2$— | $CH_3CO$— | $CH_3CO$— | Red. |
| 22 | 3-$CH_3$ | 3-$CH_3$ | do | —$CH_2CHOHCH_2Cl$ | —$CH_2CH_2$— | $CH_3CO$— | $CH_3CO$— | Red. |
| 23 | 3-$CH_3$ | 3-$CH_3$ | m-Cl phenylene | —$C_2H_4NHCOCH_3$ | —$CH_2CH_2$— | $CH_3CO$— | $CH_3CO$— | Red. |
| 24 | 4-$OCH_3$ | 3-$CH_3$ | do | —$C_2H_4NHCOCH_3$ | —$CH_2CH_2$— | $CH_3CO$— | $CH_3CO$— | Red. |
| 25 | 4-$CH_3$ | 3-$CH_3$-6-$OCH_3$ | o-Tolylene | H | —$CH_2CH_2$— | $CH_3CO$— | $CH_3CO$— | Pink. |
| 26 | 4-$NHCOCH_3$ | 3-$CH_3$ | do | H | —$CH_2CH_2$— | $CH_3CO$— | $CH_3CO$— | Do. |
| 27 | 4-$SO_2NH_2$ | 2-Cl | 3,6-di-$OCH_3$-phenylene | H | —$CH_2CH_2$— | $CH_3CO$— | $CH_3CO$— | Red. |
| 28 | 4-$NO_2$ | 3-$CH_3$ | do | —$C_2H_4Cl$ | —$CH_2CH_2$— | $CH_3CO$— | $CH_3CO$— | Red. |
| 29 | 4-$SO_2CH_3$ | 3-$OCH_3$ | m-$OCH_3$ phenylene | —$C_2H_4OH$ | —$CH_2CH_2$— | $CH_3CO$— | $CH_3CO$— | Violet. |
| 30 | 4-$SO_2CH_3$ | 3,6-di-$OCH_3$ | do | —$C_2H_4OH$ | —$CH_2CH_2$— | $CH_3CO$— | $CH_3CO$— | Do. |
| 31 | 3-$CH_2OH$ | 3,6-di-$OCH_3$ | m-Tolylene | —$C_2H_5$ | —$CH_2CH_2$— | $CH_3SO_2$— | $CH_3SO_2$— | Do. |
| 32 | None | 3-$CH_3$ | m-$NHCOCH_3$-phenylene | —$C_2H_5$ | —$CH_2CH_2$— | $CH_3SO_2$— | $CH_3SO_2$— | Pink. |

The disazo compounds of the invention may be used for dyeing hydrophobic fibers such as linear polyester, cellulose ester, acrylic, polyamide, etc. fibers in the manner described in U.S. Patents 2,880,050, 2,757,064, 2,782,187 and 2,043,827. The following examples illustrate methods by which the disazo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material.

By cellulose aliphatic carboxylic acid esters having 2 to 4 carbon atoms in the acid group thereof, we mean to include, for example, both partially hydrolyzed and unhydrolyzed cellulose acetate, cellulose propionate and cellulose acetatebutyrate.

Polymeric linear polyester materials of the terephthalate type are illustrative of the linear aromatic polyester textile materials that can be dyed with the new disazo compounds of our invention. The terephthalate fibers sold under the tradsmarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the disazo compounds.

What we claim is:

1. A water-insoluble disazo compound having the formula

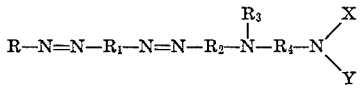

wherein

R is a monocyclic carbocyclic aromatic radical;

$R_1$ and $R_2$ are the same or different and each is p-phenylene or p-phenylene substituted with lower alkyl, lower alkoxy, halogen, lower alkylthio, lower alkanoylamido, benzamido, or lower alkylsulfonamido;

$R_3$ is hydrogen; lower alkyl; lower alkyl substituted with hydroxy, lower alkoxy, cyano, lower cyanoalkoxy, lower alkoxycarbonyl, halogen, lower alkylsulfonyl, lower alkyl —OCOO—, carbamoyl, lower alkylcarbamoyl, lower alkanoloxy, phenoxy, or lower alkylsulfonamido; phenyl; or phenyl substituted with lower alkyl, lower alkoxy, or halogen;

$R_4$ is lower alkylene; and

X and Y are the same or different and each is lower alkanyl, benzoyl, lower alkylbenzoyl, lower alkoxybenzoyl, halobenzoyl, lower alkoxycarbonyl, carbamoyl, phenylcarbamoyl, lower alkysulfonyl, phenylsulfonyl, lower alkylphenylsulfonyl, lower alkoxyphenylsulfonyl, or halophenylsulfonyl.

2. A compound according to claim 1 wherein $R_3$ is lower alkyl;

$R_4$ is ethylene; and

X and Y are each lower alkanoyl, benzoyl, lower alkylbenzoyl, lower alkoxybenzoyl, halobenzoyl, or lower alkoxycarbonyl.

3. A compound according to claim 1 wherein $R_3$ is lower alkyl;

$R_4$ is ethylene;

X is lower alkanoyl, benzoyl, lower alkylbenzoyl, lower alkoxybenzoyl, or halobenzoyl; and Y is lower alkysulfonyl, phenylsulfonyl, lower alkylphenylsulfonyl, lower alkoxyphenylsulfonyl, or halophenylsulfonyl.

4. A compound according to claim 1 wherein $R_3$ is lower alkyl;

$R_4$ is ethylene; and

X and Y are each lower alkylsulfonyl, phenylsulfonyl, lower alkylphenylsulfonyl, lower alkoxyphenylsulfonyl, or halophenylsulfonyl.

5. A disazo compound of the formula

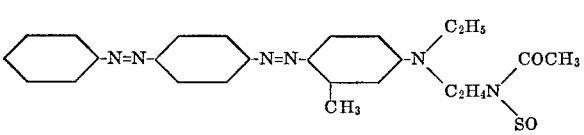

6. A disazo compound of the formula
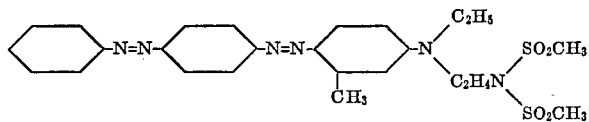
7. A disazo compound of the formula
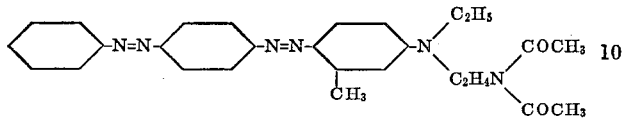
8. A disazo compound of the formula
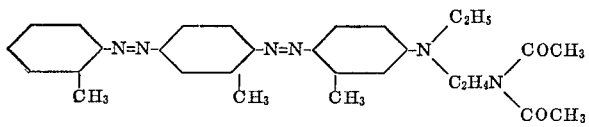
9. A disazo compound of the formula
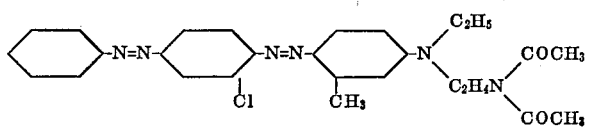
References Cited
UNITED STATES PATENTS
3,310,550   3/1967   Liechti _____ 260—152
CHARLES B. PARKER, *Primary Examiner.*
DONALD M. PAPUGA, *Assistant Examiner.*
U.S. Cl. X.R.
8—41, 55; 260—37, 152, 186, 556, 562

UNITED STATES PATENT OFFICE
CERTIFICATE OF CORRECTION

Patent No. 3,438,965                          April 15, 1969

Max A. Weaver et al.

It is certified that error appears in the above identified patent and that said Letters Patent are hereby corrected as shown below:

Column 6, line 38, "alkanoloxy" should read -- alkanoyloxy --; same line 38, after "alkanoyloxy," insert -- phenyl, --; line 43, "alkanyl" should read -- alkanoyl --; lines 71 to 75, the formula should appear as shown below:

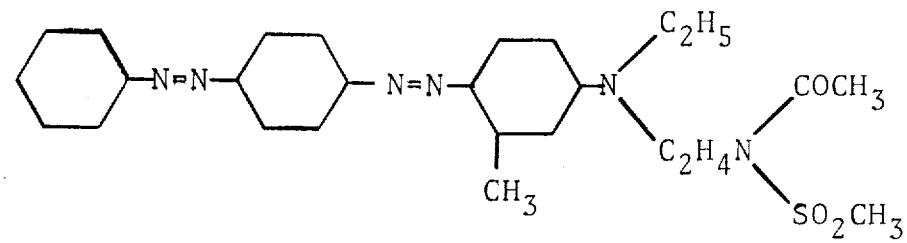

Signed and sealed this 17th day of March 1970.

(SEAL)
Attest:

EDWARD M. FLETCHER, JR.               WILLIAM E. SCHUYLER, JR.
Attesting Officer                      Commissioner of Patents